United States Patent
Hong

(10) Patent No.: US 11,085,818 B1
(45) Date of Patent: Aug. 10, 2021

(54) RAPID SENSING VALUE ESTIMATION CIRCUIT AND METHOD THEREOF

(71) Applicant: ANPEC ELECTRONICS CORPORATION, Hsinchu (TW)

(72) Inventor: Jia-Hua Hong, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 17/035,971

(22) Filed: Sep. 29, 2020

(30) Foreign Application Priority Data

Jun. 24, 2020 (TW) ................................ 109121632

(51) Int. Cl.
*G01J 1/46* (2006.01)
*G01J 1/44* (2006.01)
*G01J 1/42* (2006.01)

(52) U.S. Cl.
CPC ............. *G01J 1/46* (2013.01); *G01J 1/4228* (2013.01); *G01J 2001/446* (2013.01)

(58) Field of Classification Search
CPC .... G01J 1/46; G01J 1/44; G01J 1/4228; G01J 1/42; G01J 2001/446; G01J 2001/4466; G01J 2001/4446
See application file for complete search history.

(56) References Cited

U.S. PATENT DOCUMENTS

| | | | |
|---|---|---|---|
| 6,992,761 B2* | 1/2006 | Modlin | G01N 21/6428 250/458.1 |
| 2020/0182983 A1* | 6/2020 | Calder | G01S 7/4863 |
| 2020/0356207 A1* | 11/2020 | Routley | G06F 3/04186 |
| 2020/0408931 A1* | 12/2020 | Hering | G01N 15/065 |

* cited by examiner

*Primary Examiner* — John R Lee
(74) *Attorney, Agent, or Firm* — Li & Cai Intellectual Property (USA) Office

(57) ABSTRACT

A rapid sensing value estimation circuit and a method thereof are provided. The rapid sensing value estimation circuit includes a first sensing unit, an integration sensing circuit and a rapid estimation circuit. The rapid estimation circuit includes a clock generator, a second counter, a first digital comparator, and an arithmetic module. The clock generator generates a clock signal. The second counter counts the clock signal to generate a second count value. The first digital comparator determines whether the second count value exceeds a first predetermined count value when the first count value increases. The arithmetic module estimates the first count value at an end of an integration time according to a ratio of the second maximum count value to the second count value and the first count value when the second count value exceeding the first predetermined count value, to generate an estimated count value result.

16 Claims, 5 Drawing Sheets

RAPID SENSING VALUE ESTIMATION CIRCUIT AND METHOD THEREOF

CROSS-REFERENCE TO RELATED PATENT APPLICATION

This application claims the benefit of priority to Taiwan Patent Application No. 109121632, filed on Jun. 24, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a rapid sensing value estimation circuit and a method thereof, and more particularly to a rapid sensing value estimation circuit and a method thereof that can save time for an integration sensing circuit of a sensor to perform integration operations.

BACKGROUND OF THE DISCLOSURE

In conventional light sensors, when an original sensing signal exceeds a preset reference voltage value within an integration time, an integrator is reset, and a digital signal with a high level signal state is output through a comparator to be accumulated by a counter. After the integration time elapses, a digital value corresponding to an optical signal during the integration time can be obtained by reading a value of the counter, which represents that a sensing process of a light-to-digital sensor is completed.

However, under certain conditions, since changes in external signals are small, there is little to no difference between speeds at which original sensing signals reach the reference voltage value, but the corresponding digital result needs to be obtained in a complete integration time, thereby resulting in an increase in costs and time.

Therefore, providing a rapid sensing value estimation manner that can estimate the integration result in advance to save time and cost has become an important issue in the art.

SUMMARY OF THE DISCLOSURE

In response to the above-referenced technical inadequacies, the present disclosure provides a rapid sensing value estimation circuit and a method thereof that can save integration operation time and make other effective use of the saved time.

In one aspect, the present disclosure provides a rapid sensing value estimation circuit, including a first sensing unit, an integration sensing circuit and a rapid estimation circuit. The first sensing unit is configured to perform sensing to generate a first sensing signal. The integration sensing circuit is electrically connected to the first sensing unit and includes an operational amplifier, a comparator and a first counter. A first input terminal of the operational amplifier is electrically connected to the first sensing unit and connected to an output terminal of the operational amplifier through an integrating capacitor, and a second input terminal of the operational amplifier is grounded. The output terminal of the operational amplifier is an integration node, and the operational amplifier receives the first sensing signal and generates an integration voltage at the integrating node. A first input terminal of the comparator is electrically connected to the integration node, and a second input terminal of the comparator is electrically connected to a first reference voltage. In response to the integration voltage exceeding the first reference voltage, the comparator is configured to generate a trigger reset signal at the output terminal of the comparator, and the trigger reset signal is used to reset the integration voltage. The first counter is configured to count the trigger reset signal within an integration time to generate and correspondingly output a first count value, and the first counter has a first maximum count value within the integration time. The rapid estimation circuit includes a clock generator, a second counter, a first digital comparator, and an arithmetic module. The clock generator is configured to generate a clock signal with a first frequency. The second counter is electrically connected to the clock generator and configured to count the clock signal within the integration time to generate a second count value, and correspondingly output a second count signal. The second counter has a second maximum count value related to the first frequency within the integration time, and the second maximum count value is greater than the first maximum count value. The first digital comparator is configured to determine whether the second count value exceeds a first predetermined count value when the first count value increases. The arithmetic module is configured to, in response to the first digital comparator determining that the second count value exceeds the first predetermined count value, estimate the first count value at an end of the integration time according to a ratio of the second maximum count value to the second count value and the first count value when the second count value exceeding the first predetermined count value, to generate an estimated count value result.

In certain embodiments, the rapid sensing value estimation circuit further includes a signal amplifier connected between the first sensing unit and the integration node, and the rapid estimation circuit further includes a second digital comparator and a digital controller. The second digital comparator is configured to determine whether the first count value is zero when the second count value exceeds a second predetermined count value within the integration time and when the second count value increased. The digital controller is configured to, in response to the second digital comparator determining that the first count value is zero when the second count value exceeds the second predetermined count value, output a first control signal to control the signal amplifier to amplify the first sensing signal. The second predetermined count value is less than the first predetermined count value.

In certain embodiments, the first predetermined count value is greater than or equals to the first maximum count value.

In certain embodiments, the rapid estimation circuit further includes a status check module electrically connected to the second counter, the first digital comparator, and the second digital comparator and the digital controller, and configured to receive determination results generated by the first digital comparator and the second digital comparator, respectively, to determine to control the digital controller or the arithmetic module.

In certain embodiments, the rapid estimation circuit further includes a first register, a second register, and a third register. The first register is connected to the first digital comparator and configured to store the first predetermined count value. The second register is connected to the second digital comparator and configured to store the second predetermined count value. The third register is connected to the arithmetic module, and configured to store the estimated count value result.

In certain embodiments, the rapid sensing value estimation circuit further includes a first switch, a second sensing unit, and a third sensing unit. The first switch is connected between the first sensing unit and the first input terminal of the operational amplifier, the second sensing unit is connected to the first input terminal of the operational amplifier through a second switch, and configured to perform sensing to generate a second sensing signal, and the third sensing unit is connected to the first input terminal of the operational amplifier through a third switch, and configured to perform sensing to generate a third sensing signal.

In certain embodiments, the integration time further includes a first sub-integration time, a second sub-integration time, and a third sub-integration time, and the digital controller is configured to control the first switch, the second switch and the third switch to be turned on in the first sub-integration time, the second sub-integration time, and the third sub-integration time, respectively, to generate the corresponding estimated count value result.

In certain embodiments, the rapid sensing value estimation circuit further includes a third register, a fourth register, and a fifth register. The third register is connected to the arithmetic module, and configured to store the estimated count value result corresponding to the first sensing unit. The fourth register is connected to the arithmetic module, and configured to store the estimated count value result corresponding to the second sensing unit. The fifth register is connected to the arithmetic module, and configured to store the estimated count value result corresponding to the third sensing unit.

In another aspect, the present disclosure provides a rapid sensing value estimation method, including the following steps: configuring a first sensing unit to perform sensing to generate a first sensing signal; configuring an operational amplifier to receive the first sensing signal and generate an integration voltage on an integral node; configuring a comparator of an integration sensing circuit to perform a comparison on the integration voltage and a first reference voltage, and generate, in response to the integration voltage exceeding the first reference voltage, a trigger reset signal at an output terminal of the comparator, in which the trigger reset signal is used to reset the integration voltage; configuring a first counter of the integration sensing circuit to count the trigger reset signal within an integration time to generate and correspondingly output a first count value, in which the first counter has a first maximum count value within the integration time; configuring a clock generator of a rapid estimation circuit to generate a clock signal having a first frequency; configuring a second counter of the rapid estimation circuit to count the clock signal within the integration time to generate and correspondingly output a second count value, in which the second counter has a second maximum count value related to the first frequency within the integration time, and the second maximum count value is greater than the first maximum count value; configuring a first digital comparator of the rapid estimation circuit to determine whether the second count value exceeds a first predetermined count value when the first count value increased; and configuring an arithmetic module of the rapid estimation circuit to, in response to the first digital comparator determining that the second count value exceeds the first predetermined count value, estimate a first count value at an end of the integration time according to a ratio of the second maximum count value to the second count value and the first count value when the second count value exceeding the first predetermined count value.

In conclusion, the rapid sensing value estimation circuit and method thereof provided by the present disclosure can use an original count value result as the signal output in various applications without break a circuit structure of the original sensor and the integration sensing circuit, and can estimate results in advance under the premise of maintaining the linearity of the original architecture, and the saved integration time can be used for additional applications. Furthermore, even if the sensing signal is weak, a count value result can still be estimated in an early stage of the integration time, such that the sensing signal can be quickly amplified and then be used for estimation.

On the other hand, the saved integration time can be estimated by applying the rapid sensing value estimation circuit and method thereof provided by the present disclosure to a multi-channel sensor to estimate the count value, such that multiple sets of count value outputs can be generated within the complete integration time while the multi-channel sensor sharing one sensing circuit. In addition, since the multi-channel sensor shares one sensing circuit, the overall circuit area can be expected to be saved to reduce costs.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
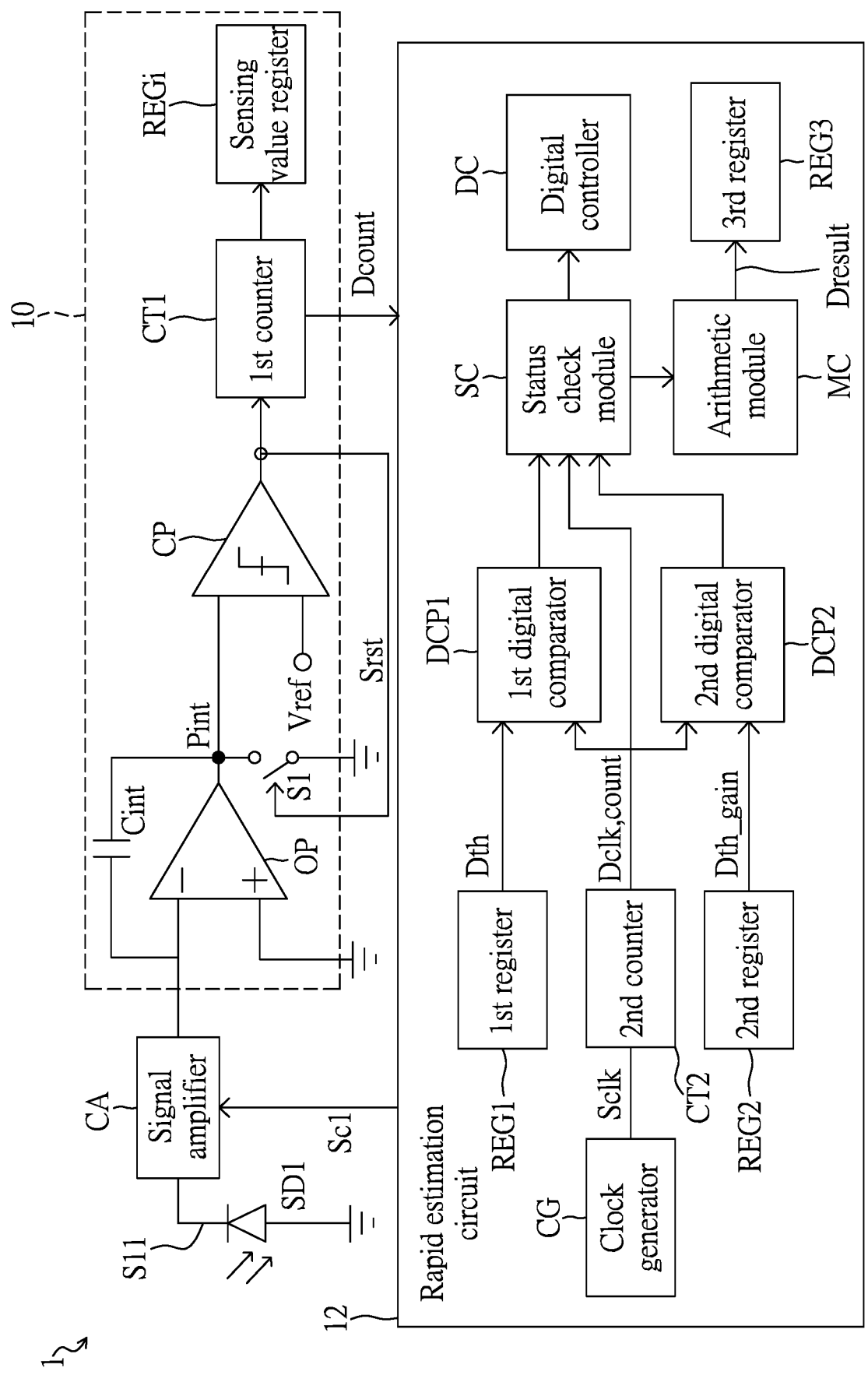
FIG. 1 is a circuit layout of a rapid sensing value estimation circuit according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1 is a circuit layout of a rapid sensing value estimation circuit according to an embodiment of the present disclosure. Reference is made to FIG. 1, an embodiment of the present disclosure that provides the rapid sensing value estimation circuit 1, including a first sensing unit SD1, an integration sensing circuit 10 and a rapid estimation circuit 12.

The first sensing unit SD1, for example, can be a photodiode, or other pressure, temperature or electronic sensors. One end of the first sensing unit SD1 is grounded, and another end of the first sensing unit SD1 can be connected to an inverting input node of an operational amplifier OP through a signal amplifier CA. After the first sensing unit SD1 performs sensing, a first sensing signal S11 is generated.

The integration sensing circuit 10 is electrically connected to the first sensing unit SD1 and includes the operational amplifier OP, an integration capacitor Cint, a comparator CP and a first counter CT1.

The inverting input terminal of the operational amplifier OP is electrically connected to the first sensing unit SD1, and is connected to the output terminal of the operational amplifier OP through the integrating capacitor Cint, and a non-inverting input terminal of the operational amplifier OP is grounded. The output terminal of the operational amplifier OP is an integration node Pint, and the operational amplifier OP receives the first sensing signal S11 to generate an integration voltage Vint on the integration node Pint.

A first input terminal of the comparator CP is electrically connected to the integration node Pint, and a second input terminal of the comparator CP is electrically connected to the first reference voltage Vref. The comparator CP can be configured to compare the integration voltage Vint of the integration node Pint to the first reference voltage Vref, and when the integration voltage Vint of the integration node Pint exceeds the first reference voltage Vref, a reset trigger signal Srst is generated at an output terminal of the comparator CP, for example, a signal with high potential. The reset trigger signal Srst can be further used to reset the integration voltage Vint of the integration node Pint. For example, the potential of the integration capacitor Cint can be reset to a ground voltage, so that the integration voltage Vint of the integration node Pint can be reset synchronously.

On the other hand, the first counter CT1 is configured to count the reset trigger signal Srst during the integration time Tint to generate and correspondingly output a first count value Dcount. In detail, limited by a reset time Trst required to reset the integration voltage Vint of the integration node Pint, the first counter CT1 has a limit of a first maximum count value within the integration time Tint, and this first maximum count value corresponds to a maximum reset frequency of the first sensing unit SD1. For example, if the integration sensing circuit 10 is designed to provide a 10-bit first maximum count value (i.e., 0-1023) within the inherent integration time Tint, the maximum reset time Trst is designed as 1/1024 of the integration time Tint, and the present disclosure utilize a higher frequency clock signal to estimate the reset time Trst, which will be described in further detail below. When the integration time Tint elapses, the first counter CT1 can store a cumulatively generated first count value Dcount' into the sensing value register REGi.

With further reference to FIG. 1, the rapid estimation circuit 12 can include a clock generator CG, a second counter CT2, a first digital comparator DCP1, and an arithmetic module MC. The clock generator CG can be configured to generate a clock signal Sclk with a first frequency f1. The clock signal Sclk can be generated by an external signal or an internal of a circuit, and can be synchronized through a digital circuit, which can then be used as a standard clock for determination. The second counter CT2 is electrically connected to the clock generator CG, and is configured to count the clock signal Sclk during the integration time Tint to generate and correspondingly output the second count value Dclk,count.

The second counter CT2 has a second maximum count value related to the first frequency f1 within the integration time Tint, and the second maximum count value is greater than the first maximum count value. In detail, in order to estimate the final obtained first count value Dcount' within a time less than the integration time Tint, it is necessary to use a first frequency that has a higher reset frequency than the maximum reset frequency of the first sensing unit SD1, thereby having the second maximum count value greater than the first maximum count value. For example, the second counter CT2 can use each clock pulse as 1/8192 of the integration time Tint, so the second maximum count value can be 8192.

However, when the prematurely estimated first count value Dcount' is finally obtained, the resolution will become worse than that of the integration sensing circuit 10 due to the lack of information. Therefore, in order to ensure linearity of the original architecture, the first digital comparator DCP1 is further used to set restriction conditions. The first digital comparator DCP1 can determine whether the second count value Dclk,count exceeds the first predetermined count value Dth when the first count value Dcount increases (for example, increment of 1). In some embodiments, the first predetermined count value Dth may be the same as the first maximum count value, or at least greater than the first maximum count value. For example, if the first maximum count value is 1024, the first predetermined count value Dth can be set to 1024.

In some embodiments, the fast estimation circuit 12 further includes a status check module SC, which is electrically connected to the second counter CT2 and the first digital comparator DCP1. When the first digital comparator DCP1 determines that the second count value Dclk,count exceeds the first predetermined count value Dth after the first count value Dcount increases (for example, increment of 1), the first digital comparator DCP1 will generate a corresponding determination signal, and the status check module SC can determine to use the arithmetic module MC for estimation according to the determination signal.

Furthermore, the arithmetic module MC is configured to, in response to the first digital comparator circuit determining that the second count value Dclk,count exceeds the first predetermined count value, estimate a first count value Dcount' at the end of the integration time Tint according to a ratio of the second maximum count value to the second count value Dclk,count and the first count value Dcount when the second count value Dclk,count exceeds the first predetermined count value Dth, thereby generating an estimated count value result.

Figure 2:
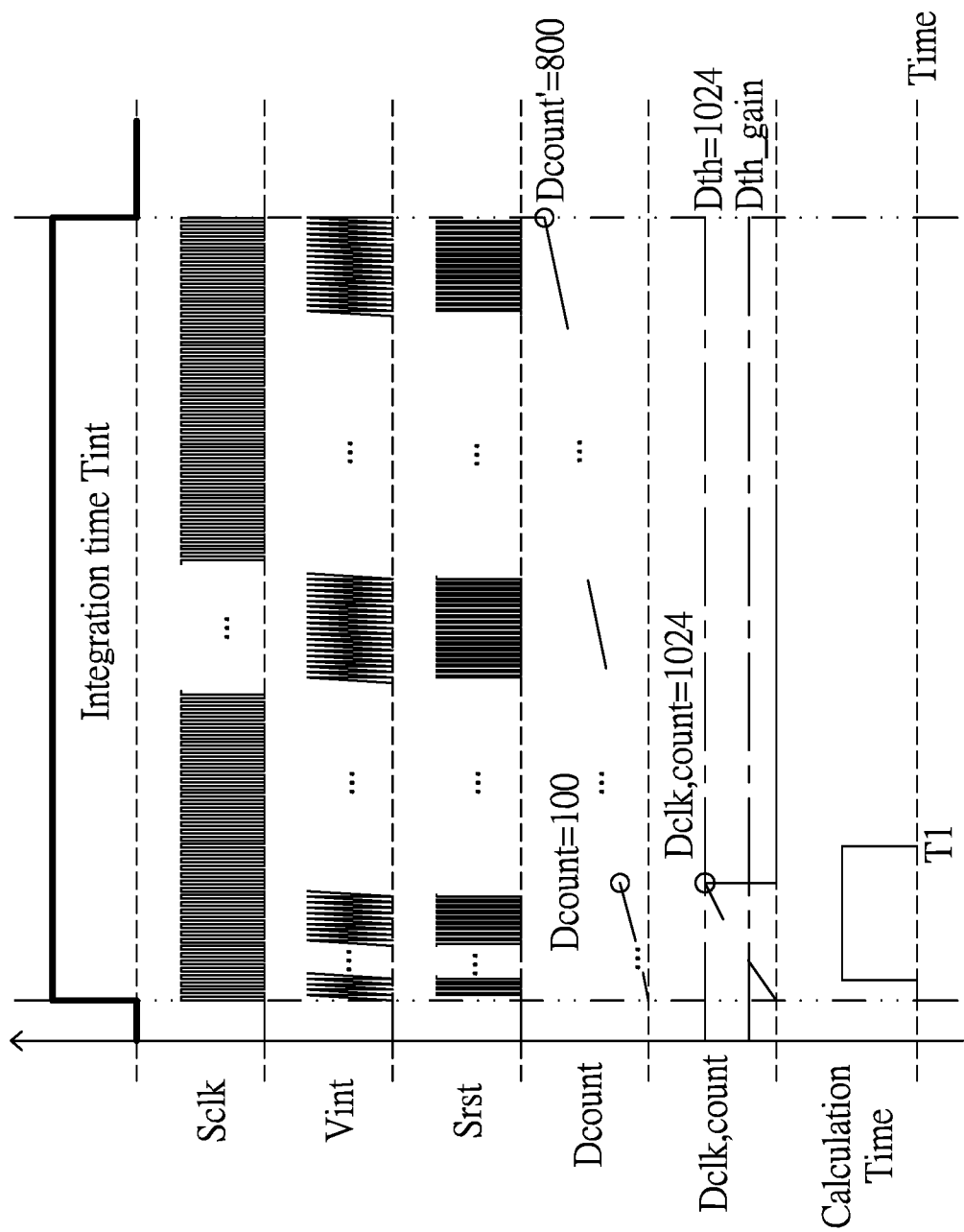
FIG. 2 is a signal timing diagram showing an integration time, a clock signal, an integration voltage, a trigger reset signal, a first count value, a second count value, and a calculation time according to the embodiment of the present disclosure.

For example, reference can be made to FIG. 2, which is a signal timing diagram showing an integration time, a clock signal, an integration voltage, a trigger reset signal, a first count value, a second count value, and a calculation time according to an embodiment of the present disclosure. For example, the clock signal Sclk can have a period of 1/8192 of the integration time Tint, and the first predetermined count value Dth is set to 1024. Every time an entry of the first count value Dcount occurs, the arithmetic module MC determines whether the second count value Dclk,count at this time exceeds the first predetermined count value Dth, if the second count value Dclk,count at this time does not exceed the first predetermined count value Dth, the second count value Dclk,count continues to count the clock signal Sclk until the second count value Dclk,count exceeds the first predetermined count value Dth, then a calculation is started by the arithmetic module MC.

In this case, the ratio of the second maximum count value MaxDclk,count to the second count value Dclk,count is 8192/1024, which is 8. At this time, as shown in FIG. 2, when the second count value Dclk,count exceeds the first predetermined count value Dth, the first count value Dcount is 100. Therefore, the first count value Dcount' at the end of the integration time can be estimated by the following equation (1) to generate the estimated count value result Dresult:

$$D\text{result}=\text{Max}D\text{clk,count}*D\text{count}/D\text{clk,count} \quad \text{Eq}(1);$$

From equation (1), the estimated count value result Dresult can be obtained to be 8196*100/1024, which is 800. Further, the ratio of the calculation time T1 to the overall integration time Tint at this time can be reduced to less than ⅓. The present disclosure calculates the signal change trend in a short time and estimates the result at the end of the complete integration time. That is, it can save the time of waiting for the circuit to perform integration, 75% to 95% of the integration time can be saved for each calculation, and the saved integration time can be further used for other purposes.

On the other hand, if the first sensing signal S11 generated by the first sensing unit SD1 is extremely weak, a case in which the second count value Dclk,count is counted to be a very high value while the first count value Dcount is still zero, which in turn leads to an increase in estimated time or even unpredictable conditions. Therefore, the present disclosure sets another restriction by setting a second digital comparator DCP2, and determines whether to amplify the first sensing signal S11 generated by the first sensing unit SD1 based on the restriction before performing the calculation.

In some embodiments, the rapid sensing value estimation circuit 1 further includes a signal amplifier CA connected between the first sensing unit SD1 and the integration node Pint. The signal amplifier CA can be, for example, a current amplifier for amplifying the first sensing signal S11, but is not limited thereto. In practice, a type of signal amplifier CA used can be determined according to a type of the first sensing unit SD1.

On the other hand, the rapid estimation circuit 12 further includes a second digital comparator DCP2 and a digital controller DC. The second digital comparator DCP2 can determine whether the first count value Dcount is zero when the second count value Dclk,count exceeds a second predetermined count value Dth_gain within the integration time Tint, and when the second count value Dclk,count increases.

The digital controller DC is configured to, in response to the second digital comparator DCP2 determining that when the second count value Dclk,count exceeds the second predetermined count value Dth_gain and the first count value Dcount is zero, output a first control signal Sc1 to control the signal amplifier CA to amplify the first sensing signal S11. The second predetermined count value Dth_gain can be set to be smaller than the first predetermined count value Dth. For example, the second predetermined count value Dth_gain can be ⅓ or ¼ of the first predetermined count value Dth. Therefore, even if the first sensing signal S11 is weak, it can still be determined by the second digital comparator DCP2 in an early stage of the integration time Tint, such that the first sensing signal S11 can be quickly amplified and be used for further estimation.

In some embodiments, the status check module SC can be further electrically connected to a second digital comparator DCP2 and a digital controller DC. When the second digital comparator DCP2 determines the second count value Dclk,count exceeds the second predetermined count value Dth_gain and the first count value Dcount is zero, the second digital comparator DCP2 generates a corresponding determination signal, and the status check module SC can determine to configure the digital controller DC to control the signal amplifier CA to amplify the first sensing signal S11 according to the determination signal.

In addition, the rapid estimation circuit 12 can further include a first register REG1, a second register REG2, and a third register REG3. The first register REG1 is connected to the first digital comparator DCP1 and configured to store the first predetermined count value Dth. The second register REG2 is connected to the second digital comparator DCP2 and configured to store the second predetermined count value Dth_gain. The third register REG3 is connected to the arithmetic module MC, and is configured to store the estimated count value result Dresult.

Figure 3:
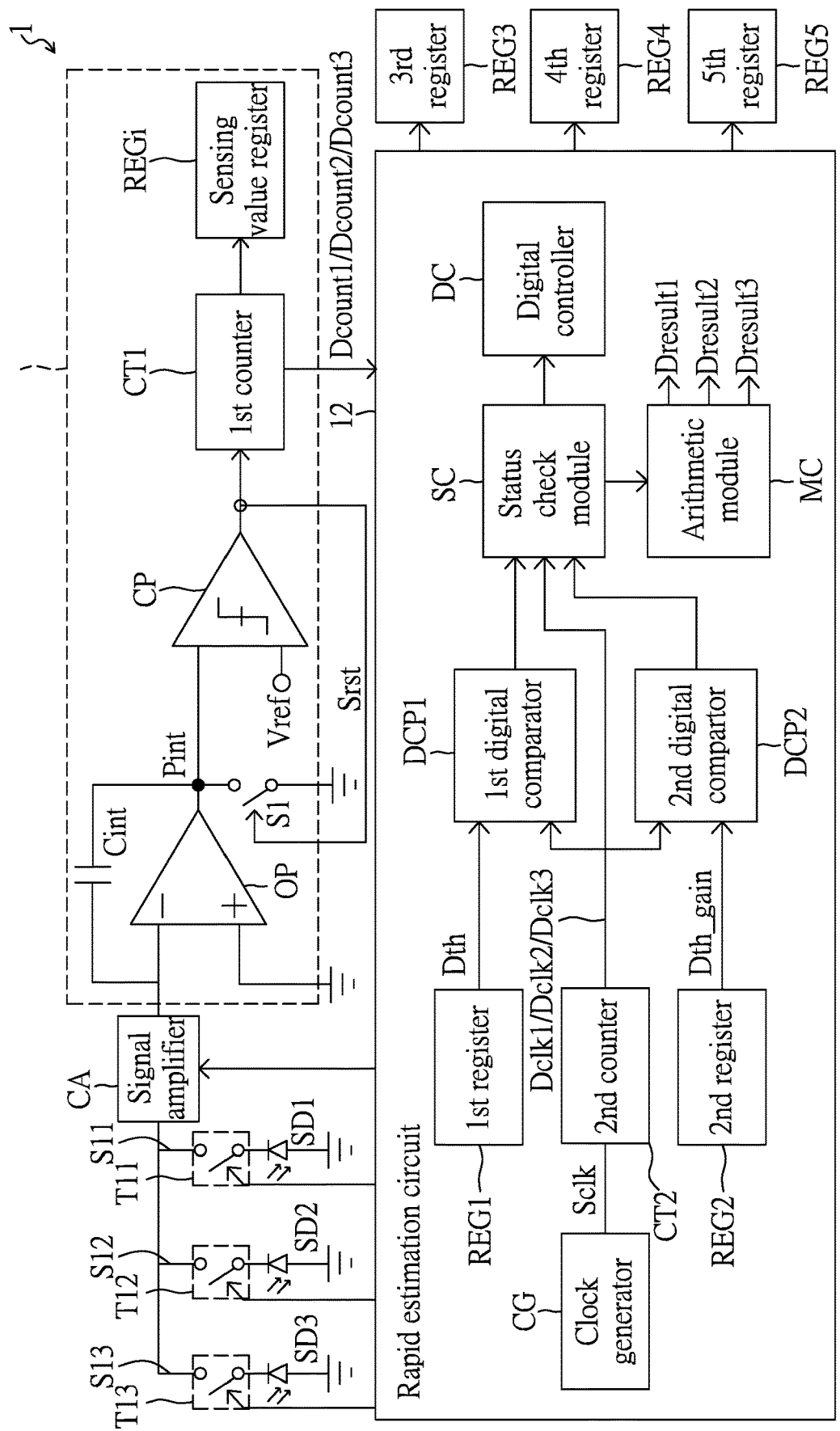
FIG. 3 is a circuit layout of a rapid sensing value estimation circuit according to another embodiment of the present disclosure.

Reference is further made to FIG. 3, which is a circuit layout of a rapid sensing value estimation circuit according to another embodiment of the present disclosure.

In another embodiment of the present disclosure, the same components as in FIG. 1 are denoted with the same reference numerals, and the repeated descriptions are omitted. In the present embodiment, the rapid sensing value estimation circuit 1 further includes a first switch T11, a second switch T12, a third switch T13, a second sensing unit SD2, and a third sensing unit SD3. The first switch T11 is connected between the first sensing unit SD1 and the current amplifier CA. The second sensing unit SD2 is connected to the inverting input terminal of the operational amplifier OP through the second switch T12 and the current amplifier CA, and is configured to perform sensing to generate a second sensing signal S12. The third sensing unit SD3 is connected to the inverting input terminal of the operational amplifier OP through the third switch T13 and the current amplifier CA, and is configured to perform sensing to generate a third sensing signal S13.

As described in the previous embodiment, the rapid sensing value estimation circuit of the present disclosure can save the time of waiting for the circuit to perform integration, and the saved integration time can be further used for other purposes. In this embodiment, the saved integration time Tint is further used for estimating multiple sets of sensing signals, such that multiple sets of count value outputs can be generated within the complete integration time while the multi-channel sensor sharing one sensing circuit.

Figure 4:
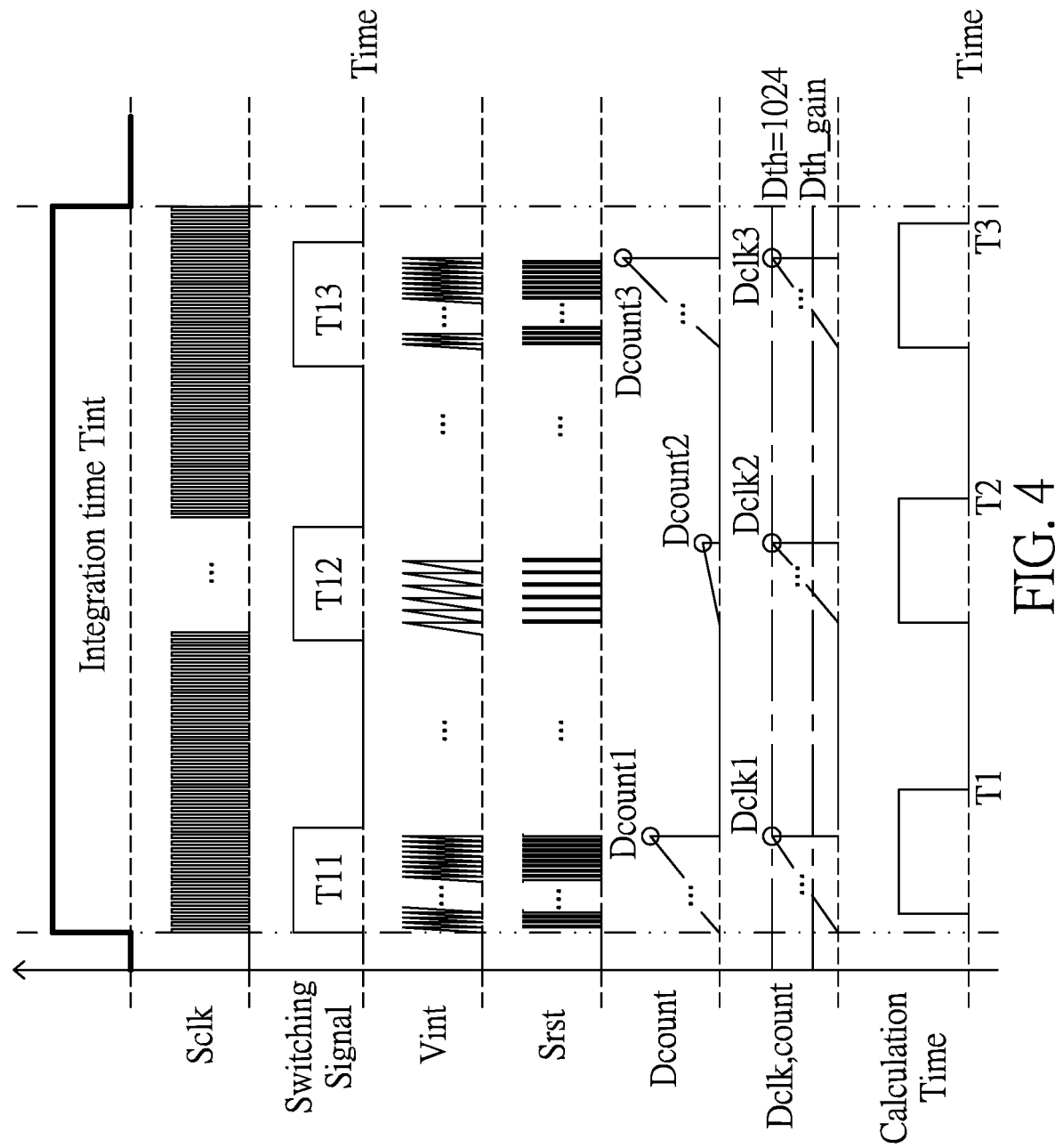
FIG. 4 is a signal timing diagram showing an integration time, a clock signal, an integration voltage, a trigger reset signal, a first count value, a second count value, and a calculation time according to the another embodiment of the present disclosure.

For example, reference can be made to FIG. 4, which is a signal timing diagram showing an integration time, a clock signal, an integration voltage, a trigger reset signal, a first count value, a second count value, and a calculation time according to another embodiment of the present disclosure. In this embodiment, the integration time Tint further includes a first sub-integration time T1, a second sub-integration time T2, and a third sub-integration time T3, and the digital controller DC is configured to control the first switch T11, the second switch T12, and the third switch T13 to be turned on by switching signals in the first sub-integration time T1, the second sub-integration time T2, and the third sub-integration time T3, respectively, such that the first counter CT1 and the second counter CT2 are respectively counts the first sensing signal S11, the second sensing signal S12 and the third sensing signal S13 in the sub-integration time T1, the second sub-integration time T2, and the third sub-integration time T3 to generate corresponding first count values Dcount1, Dcount2, and Dcount3, and second count values Dclk1, Dclk2, and Dclk3. In addition, in a manner similar to the previous embodiment, under a condition that the second count values Dclk1, Dclk2, and Dclk3 exceed the first predetermined value Dth, the corresponding estimated count value results Dresult1, Dresult2 and Dresult3 can be estimated by the arithmetic module MC.

In some embodiments, the rapid sensing value estimation circuit 1 further includes a third register REG3, a fourth register REG4, and a fifth register REG5. The third register REG3 is connected to the arithmetic module MC, and is configured to store the estimated count value result Dresult1 corresponding to the first sensing unit SD1. The fourth register REG4 is connected to the arithmetic module MC, and is configured to store the estimated count value result Dresult2 corresponding to the second sensing unit SD2. The fifth register REG5 is connected to the arithmetic module MC, and is configured to store the estimated count value result Dresult3 corresponding to the third sensing unit SD3.

Therefore, by utilizing the rapid sensing value estimation circuit provided by the present disclosure, an original count value result can be used as the signal output in various applications without break a circuit structure of the original sensor and the integration sensing circuit, and results can be estimated in advance under the premise of maintaining the linearity of the original architecture, and the saved integration time can be used for additional applications. Furthermore, even if the sensing signal is weak, the count value result can still be estimated in an early stage of the integration time, such that the sensing signal can be quickly amplified and then be used for estimation.

On the other hand, the saved integration time can be estimated by applying the rapid sensing value estimation circuit provided by the present disclosure to a multi-channel sensor to estimate the count value, such that multiple sets of count value outputs can be generated within the complete integration time while the multi-channel sensor sharing one sensing circuit. In addition, since the multi-channel sensor shares one sensing circuit, the overall circuit area can be expected to be saved to reduce costs.

Figure 5:
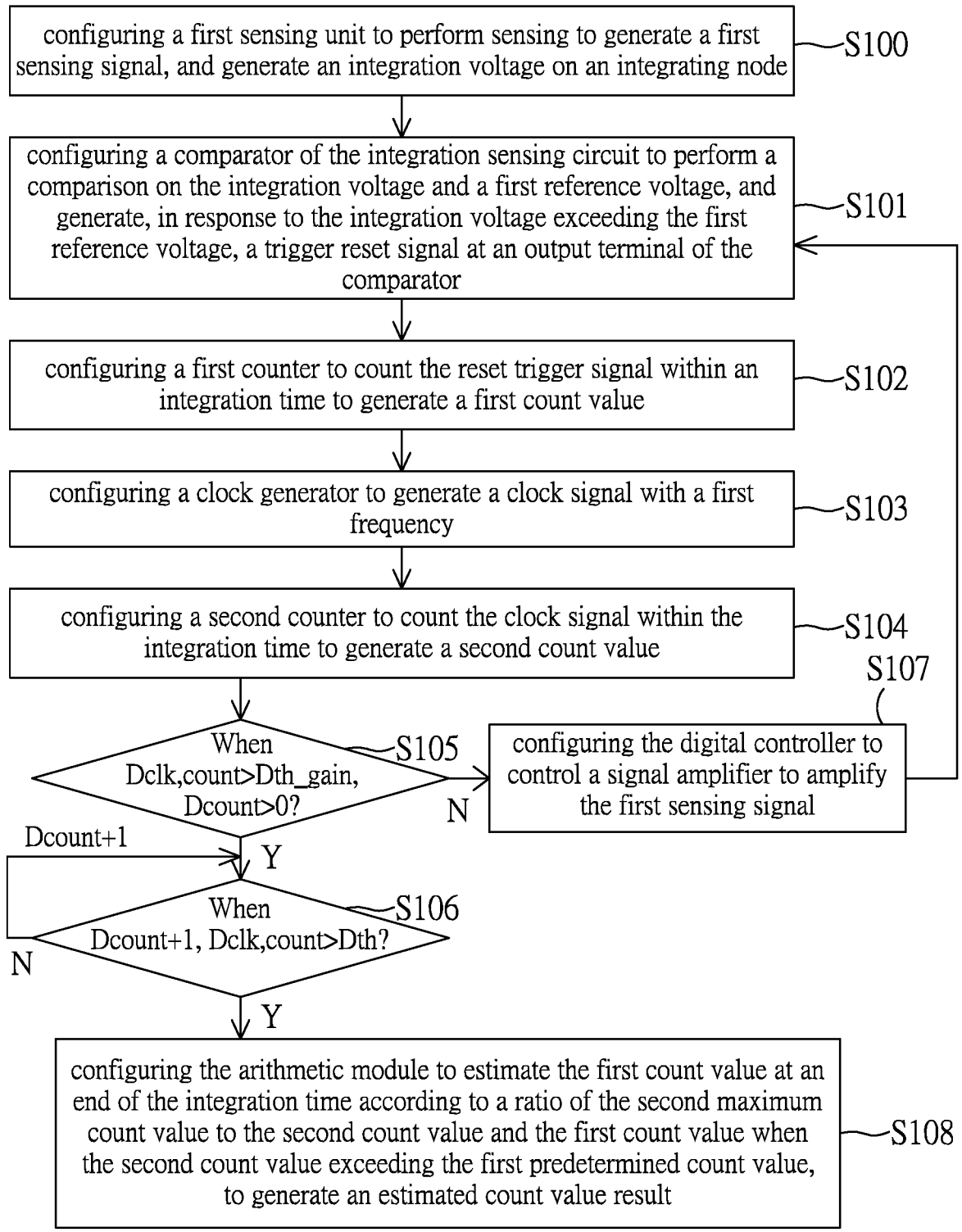
FIG. 5 is a flowchart of a rapid sensing value estimation method according to the embodiment of the present disclosure.

In addition, reference can be further made to FIG. 5, which is a flowchart of a rapid sensing value estimation method according to an embodiment of the present disclosure. As shown in FIG. 5, the present disclosure further provides a rapid sensing value estimation method, which is suitable for the rapid sensing value estimation circuit of the foregoing embodiment, and the method includes the following steps:

Step S100: configuring a first sensing unit to perform sensing to generate a first sensing signal, and generate an integration voltage on an integrating node.

Step S101: configuring a comparator of the integration sensing circuit to perform a comparison on the integration voltage and a first reference voltage, and generate, in response to the integration voltage exceeding the first reference voltage, a trigger reset signal at an output terminal of the comparator.

Step S102: configuring a first counter to count the reset trigger signal within an integration time to generate a first count value.

Step S103: configuring a clock generator to generate a clock signal with a first frequency.

Step S104: configuring a second counter to count the clock signal within the integration time to generate a second count value.

Step S105: configuring a second digital comparator to determine whether the first count value is zero when the second count value exceeds a second predetermined count value within the integration time and when the second count value increased. If the first count value is zero when the second count value exceeds the second predetermined count value within the integration time and when the second count value increased, the method proceeds to step S106: configuring a first digital comparator to determine whether the second count value exceeds the first predetermined count value when the first count value increases.

If the second digital comparator determines that the first count value is not zero when the second count value exceeds the second predetermined count value within the integration time and when the second count value increased, the method proceeds to step S107, configuring the digital controller to control a signal amplifier to amplify the first sensing signal, and the method returns to step S101.

If the first digital comparator determines that the second count value does not exceed the first predetermined count value when the first count value increases in the step S106, then the step S106 is repeated after waiting for the first count value to increase. If the first digital comparator determines that the second count value exceeds the first predetermined count value when the first count value increases in the step S106, the method proceeds to step S108: configuring the arithmetic module to estimate the first count value at an end of the integration time according to a ratio of the second maximum count value to the second count value and the first count value when the second count value exceeding the first predetermined count value, to generate an estimated count value result.

In conclusion, the rapid sensing value estimation circuit and method thereof provided by the present disclosure can use an original count value result as the signal output in various applications without break a circuit structure of the original sensor and the integration sensing circuit, and can estimate results in advance under the premise of maintaining the linearity of the original architecture, and the saved integration time can be used for additional applications. Furthermore, even if the sensing signal is weak, the count value result can still be estimated in an early stage of the integration time, such that the sensing signal can be quickly amplified and then be used for estimation.

On the other hand, the saved integration time can be estimated by applying the rapid sensing value estimation circuit and method thereof provided by the present disclosure to a multi-channel sensor to estimate the count value, such that multiple sets of count value outputs can be generated within the complete integration time while the multi-channel sensor sharing one sensing circuit. In addition, since the multi-channel sensor shares one sensing circuit, the overall circuit area can be expected to be saved to reduce costs.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A rapid sensing value estimation circuit, comprising:
    a first sensing unit configured to perform sensing to generate a first sensing signal;
    an integral sensing circuit electrically connected to the first sensing unit and including:
        an operational amplifier having a first input terminal electrically connected to the first sensing unit and connected to an output terminal of the operational amplifier through an integrating capacitor, and having a second input terminal being grounded, wherein the output terminal of the operational amplifier is an integration node, and the operational amplifier receives the first sensing signal and generates an integration voltage at the integrating node;
        a comparator having a first input terminal electrically connected to the integration node, and a second input terminal electrically connected to a first reference voltage, wherein in response to the integration voltage exceeding the first reference voltage, the comparator is configured to generate a trigger reset signal at the output terminal of the comparator, wherein the trigger reset signal is used to reset the integration voltage; and
        a first counter configured to count the trigger reset signal within an integration time to generate and correspondingly output a first count value, wherein the first counter has a first maximum count value within the integration time; and
    a rapid estimation circuit including:
        a clock generator configured to generate a clock signal having a first frequency;
        a second counter electrically connected to the clock generator and configured to count the clock signal within the integration time to generate and correspondingly output a second count value, wherein the second counter has a second maximum count value related to the first frequency within the integration time, and the second maximum count value is greater than the first maximum count value;
        a first digital comparator configured to determine whether the second count value exceeds a first predetermined count value when the first count value increases; and
        an arithmetic module configured to, in response to the first digital comparator determining that the second count value exceeds the first predetermined count value, estimate the first count value at an end of the integration time according to a ratio of the second maximum count value to the second count value and the first count value when the second count value exceeding the first predetermined count value, to generate an estimated count value result.

2. The rapid sensing value estimation circuit according to claim 1, further comprising a signal amplifier connected between the first sensing unit and the integration node, wherein the rapid estimation circuit further includes:
    a second digital comparator configured to determine whether the first count value is zero when the second count value exceeds a second predetermined count value within the integration time and when the second count value increases; and
    a digital controller configured to, in response to the second digital comparator determining that the first count value is zero when the second count value exceeds the second predetermined count value, output a first control signal to control the signal amplifier to amplify the first sensing signal,
    wherein the second predetermined count value is less than the first predetermined count value.

3. The rapid sensing value estimation circuit according to claim 1, wherein the first predetermined count value is greater than or equals to the first maximum count value.

4. The rapid sensing value estimation circuit according to claim 2, wherein the rapid estimation circuit further includes a status check module electrically connected to the second counter, the first digital comparator, the second digital comparator, and the digital controller, and the status check module is configured to receive determination results generated by the first digital comparator and the second digital comparator, respectively, to determine whether to control the digital controller or the arithmetic module.

5. The rapid sensing value estimation circuit according to claim 2, wherein the rapid estimation circuit further includes:
    a first register connected to the first digital comparator and configured to store the first predetermined count value;
    a second register connected to the second digital comparator and configured to store the second predetermined count value; and
    a third register connected to the arithmetic module, and configured to store the estimated count value result.

6. The rapid sensing value estimation circuit according to claim 2, further comprising:
    a first switch connected between the first sensing unit and the first input terminal of the operational amplifier;

a second sensing unit connected to the first input terminal of the operational amplifier through a second switch, and configured to perform sensing to generate a second sensing signal; and a third sensing unit connected to the first input terminal of the operational amplifier through a third switch, and configured to perform sensing to generate a third sensing signal.

7. The rapid sensing value estimation circuit according to claim 6, wherein the integration time further includes a first sub-integration time, a second sub-integration time, and a third sub-integration time, and the digital controller is configured to control the first switch, the second switch and the third switch to be turned on in the first sub-integration time, the second sub-integration time, and the third sub-integration time, respectively, to generate the corresponding estimated count value result.

8. The rapid sensing value estimation circuit according to claim 7, further comprising:
    a third register connected to the arithmetic module, and configured to store the estimated count value result corresponding to the first sensing unit;
    a fourth register connected to the arithmetic module, and configured to store the estimated count value result corresponding to the second sensing unit; and
    a fifth register connected to the arithmetic module, and configured to store the estimated count value result corresponding to the third sensing unit.

9. A rapid sensing value estimation method, comprising the following steps:
    configuring a first sensing unit to perform sensing to generate a first sensing signal;
    configuring an operational amplifier to receive the first sensing signal and generate an integration voltage on an integral node;
    configuring a comparator of an integration sensing circuit to perform a comparison on the integration voltage and a first reference voltage, and generate, in response to the integration voltage exceeding the first reference voltage, a trigger reset signal at an output terminal of the comparator, wherein the trigger reset signal is used to reset the integration voltage;
    configuring a first counter of the integration sensing circuit to count the trigger reset signal within an integration time to generate and correspondingly output a first count value, wherein the first counter has a first maximum count value within the integration time;
    configuring a clock generator of a rapid estimation circuit to generate a clock signal having a first frequency;
    configuring a second counter of the rapid estimation circuit to count the clock signal within the integration time to generate and correspondingly output a second count value, wherein the second counter has a second maximum count value related to the first frequency within the integration time, and the second maximum count value is greater than the first maximum count value;
    configuring a first digital comparator of the rapid estimation circuit to determine whether the second count value exceeds a first predetermined count value when the first count value increases; and
    configuring an arithmetic module of the rapid estimation circuit to, in response to the first digital comparator determining that the second count value exceeds the first predetermined count value, estimate a first count value at an end of the integration time according to a ratio of the second maximum count value to the second count value and the first count value when the second count value exceeding the first predetermined count value.

10. The rapid sensing value estimation method according to claim 9, further comprising:
    configuring a second digital comparator of the rapid estimation circuit to determine whether the first count value is zero when the second count value exceeds a second predetermined count value within the integration time and when the second count value increases; and
    configuring a digital controller of the rapid estimation circuit to, in response to the second digital comparator determining that the first count value is zero when the second count value exceeds the second predetermined count value, output a first control signal to control the signal amplifier connected between the first sensing unit and the integration node to amplify the first sensing signal,
    wherein the second predetermined count value is less than the first predetermined count value.

11. The rapid sensing value estimation method according to claim 9, wherein the first predetermined count value is greater than or equals to the first maximum count value.

12. The rapid sensing value estimation method according to claim 10, further comprising: configuring a status check module of the rapid estimation circuit to receive determination results generated by the first digital comparator and the second digital comparator, respectively, to determine to control the digital controller or the arithmetic module.

13. The rapid sensing value estimation method according to claim 9, further comprising:
    configuring a first register of the rapid estimation circuit to store the first predetermined count value;
    configuring a second register of the rapid estimation circuit to store the second predetermined count value; and
    configuring a third register of the rapid estimation circuit to store the estimated count value result.

14. The rapid sensing value estimation method according to claim 10, wherein the first sensing unit is connected to a first input terminal of the operational amplifier through a first switch, and the rapid sensing value estimation method further comprises:
    configuring a second sensing unit connected to the first input terminal of the operational amplifier through a second switch to perform sensing to generate a second sensing signal; and
    configuring a third sensing unit connected to the first input terminal of the operational amplifier through a third switch to perform sensing to generate a third sensing signal.

15. The rapid sensing value estimation method according to claim 14, wherein the integration time further includes a first sub-integration time, a second sub-integration time and a third sub-integration time, and the rapid sensing value estimation method further comprises:
    configuring the digital controller to control the first switch, the second switch and the third switch to be turned on in the first sub-integration time, the second sub-integration time, and the third sub-integration time, respectively, to generate the corresponding estimated count value result.

16. The rapid sensing value estimation method according to claim 15, further comprising:

configuring a third register connected to the arithmetic module to store the estimated count value result corresponding to the first sensing unit;

configuring a fourth register connected to the arithmetic module to store the estimated count value result corresponding to the second sensing unit; and configuring a fifth register connected to the arithmetic module to store the estimated count value result corresponding to the third sensing unit.

* * * * *